US005531846A

United States Patent [19]

Miraglia et al.

[11] Patent Number: 5,531,846

[45] Date of Patent: Jul. 2, 1996

[54] APPARATUS AND METHOD FOR RESEALING TONER CARTRIDGES

[75] Inventors: Phillip Miraglia, Woodstock, Ga.; Dennis Christopherson, Englewood, Colo.; Robert Carter, Denver, Colo.; Tadatoshi Umeda, Aruaoa, Colo.

[73] Assignee: Recycling Concepts, Ltd., Marietta, Ga.

[21] Appl. No.: 218,019

[22] Filed: Mar. 24, 1994

[51] Int. Cl.$^6$ .......... B23B 31/00

[52] U.S. Cl. .......... 156/64; 156/94; 156/322; 156/350; 156/358; 156/359; 355/260

[58] Field of Search .......... 156/64, 94, 98, 156/309.9, 322, 350, 358, 359, 583.1, 556; 222/365, DIG. 1; 355/260

[56] References Cited

U.S. PATENT DOCUMENTS

| | | | |
|---|---|---|---|
| 3,953,277 | 4/1976 | Kuhns | 156/360 |
| 4,448,626 | 5/1984 | Off et al. | 156/350 X |
| 4,634,025 | 1/1987 | Swartling | 222/161 |
| 4,778,555 | 10/1988 | Mortoly et al. | 156/350 |
| 4,963,221 | 10/1990 | Isobe et al. | 156/358 |
| 5,184,182 | 2/1993 | Michlin | 355/260 |
| 5,282,003 | 1/1994 | Michlin | 355/260 |
| 5,370,761 | 12/1994 | Chitouras | 156/94 |
| 5,407,518 | 4/1995 | Baley, Jr. | 156/344 |

FOREIGN PATENT DOCUMENTS

| | | | |
|---|---|---|---|
| WO92/10404 | 6/1992 | WIPO | B65B 7/28 |

*Primary Examiner*—David A. Simmons
*Assistant Examiner*—Paul M. Rivard
*Attorney, Agent, or Firm*—Jones & Askew

[57] ABSTRACT

Resealing apparatus for closing the toner-dispensing slot of a toner cartridge, preparatory to refilling that cartridge with toner. The apparatus includes a pair of work stations, each including a fixture for receiving an empty toner cartridge and a guide for supporting a seal insertion tool into predetermined juxtaposition with that cartridge. A motorized actuator extends each seal insertion tool into juxtaposition with the toner cartridge, and retracts that tool from the cartridge after sealing is completed. Powered clamps engage the toner cartridge to assure positive contact between the cartridge and the seal. A single heater power supply is selectively connected to the seal insertion tools of each work station. A programmed logic controller performs the sequence of resealing operations for each work station, once initiated by an operator, so that the operator may then prepare the other work station for a resealing operation. Also disclosed is a tool for temporary insertion within a toner cartridge being resealed, to keep that cartridge from deforming during resealing.

8 Claims, 9 Drawing Sheets

APPARATUS AND METHOD FOR RESEALING TONER CARTRIDGES

FIELD OF THE INVENTION

This invention relates in general to recycling of toner cartridges for laser print engines, and relates in particular to apparatus and a method for resealing toner cartridges.

BACKGROUND OF THE INVENTION

The print engines used in laser printers, and in other printing devices such as photocopiers and facsimile machines that use laser printing technology, usually rely on a removable toner cartridge to supply the toner or printing medium used in the printing process. When the toner is exhausted from a particular toner cartridge, that cartridge is removed and replaced by another cartridge containing a fresh supply of toner. These toner cartridges typically have an opening in the shape of an elongated slot through which the toner is dispensed as the print engine operates, and that opening initally is sealed to prevent spillage of the toner during shipment and other handling of the toner cartridge. This seal must be removed when the toner cartridge is installed for use in a print engine, as is known to those skilled in the art.

Used toner cartridges frequently are recycled for muse. This recycling includes refining the cartridge with a fresh supply of toner. Because the toner itself is a fine powdery substance, most users of laser printers and similar apparatus choose not to refill their own used toner cartridges. Instead, used toner cartridges usually are refilled by others who make that activity their business, and who then ship the recycled toner cartridges to their customers for reuse. Because these recycled toner cartridges are handled and shipped after being refilled with toner, the toner-dispensing opening in each cartridge must be resealed to prevent spillage of the toner during shipment and handling. The preferred seal for resealing such toner cartridges is bonded or otherwise sealed to the cartridge so as to provide a fluid-tight seal in any attitude of the cartridge, but the seal should be readily removable by the user when the recycled cartridge is being installed in a print engine. Of significance from the viewpoint of those engaged in the business of recycling toner cartridges, the resealing process should take place in an expeditious manner so as to minimize that aspect of the cost associated with recycling the toner cartridges.

SUMMARY OF THE INVENTION

Stated in general terms, toner cartridges are resealed according to the present invention by supporting the toner cartridge to maintain the unsealed opening in a certain attitude, and moving a seal insertion tool along a predetermined path which places that tool in juxtaposition with the toner-dispensing opening in the toner cartridge. The seal insertion tool is selectively heatable, and carries a seal which adheres to the toner cartridge when heated by the insertion tool. After the seal has become adhered to the toner cartridge, thereby resealing the opening in the cartridge, the insertion tool is withdrawn from the cartridge and the now-resealed cartridge can be refilled with toner in a subsequent operation. A motorized actuator transfers the seal insertion tool to be extended toward the toner cartridge or withdrawn therefrom. A clamp engages the cartridge to urge the seal insertion tool and the seal into contact with the cartridge surface surrounding the unsealed opening.

Stated with somewhat greater particularity, the apparatus of the present invention includes a fixture for supporting a used toner cartridge to maintain the unsealed opening in a certain attitude. A guide is located adjacent one end of the fixture, so that the seal insertion tool carrying a seal can be inserted in the guide. A motorized actuator engages the seal insertion tool and moves that tool along the guide, so that the tool and a replacement seal carried by the tool are moved into a predetermined position within the toner cartridge supported by the fixture. Once the seal insertion tool is so positioned with the seal aligned in relation to the unsealed opening, a clamp located adjacent the fixture is actuated to engage the cartridge and urge the seal insertion tool toward the unsealed opening. A heater associated with the tool then is operated for a lime sufficient to cause the seal to adhere to the cartridge. After the seal is thus adhered, the motorized actuator retracts the seal insertion tool from the cartridge, whereupon the resealed cartridge can be removed from the fixture and the resealing process can commence anew for another toner cartridge.

Stated in further detail, a toner cartridge resealing apparatus according to the present invention preferably has a pair of cartridge resealing work stations positioned adjacent each other and operating under common control. Each of those work stations includes a fixture for supporting a toner cartridge to maintain an unsealed opening of the cartridge in a certain attitude, and a guide located in predetermined alignment with the corresponding fixture and operative to receive a seal insertion tool. A separate seal insertion tool is associated with each work station, so that an operator can set up a toner cartridge in one work station for resealing while a resealing operation for another cartridge is underway in the other work station. A common control apparatus is associated with both work stations, allowing the seal insertion tool of one work station to be heated for adhering the seal at that work station only after the heat sealing stage at the other work station is completed.

Some toner cartridges may become temporarily deformed by the clamping force exerted on the cartridge to press the replacement seal into intimate contact with the cartridge. This deformation, if it occurs, can cause an incomplete or otherwise defective resealing of the cartridge. The present invention overcomes toner-cartridge deformation by providing a tool that is temporarily inserted within the cartridge during the resealing procedure. This tool is expandable within the cartridge to underpin the vicinity of the cartridge undergoing resealing, thereby providing a support to the clamping force applied at that region of the cartridge.

Accordingly, it is an object of the present invention to provide improved apparatus for resealing toner cartridges.

It is another object of the present invention to provide toner cartridge resealing apparatus which partially mechanizes the resealing procedure.

It is a further object of the present invention to provide toner cartridge resealing apparatus that allows a single operator to concurrently reseal plural cartridges.

It is a further object of the present invention to provide apparatus for preventing a toner cartridge from becoming distorted while the cartridge is being resealed.

Other objects and advantages of the present invention win become more readily apparent from the following description of a preferred embodiment.

DETAILED DESCRIPTION OF PREFERRED EMBODIMENT

Figure 1:
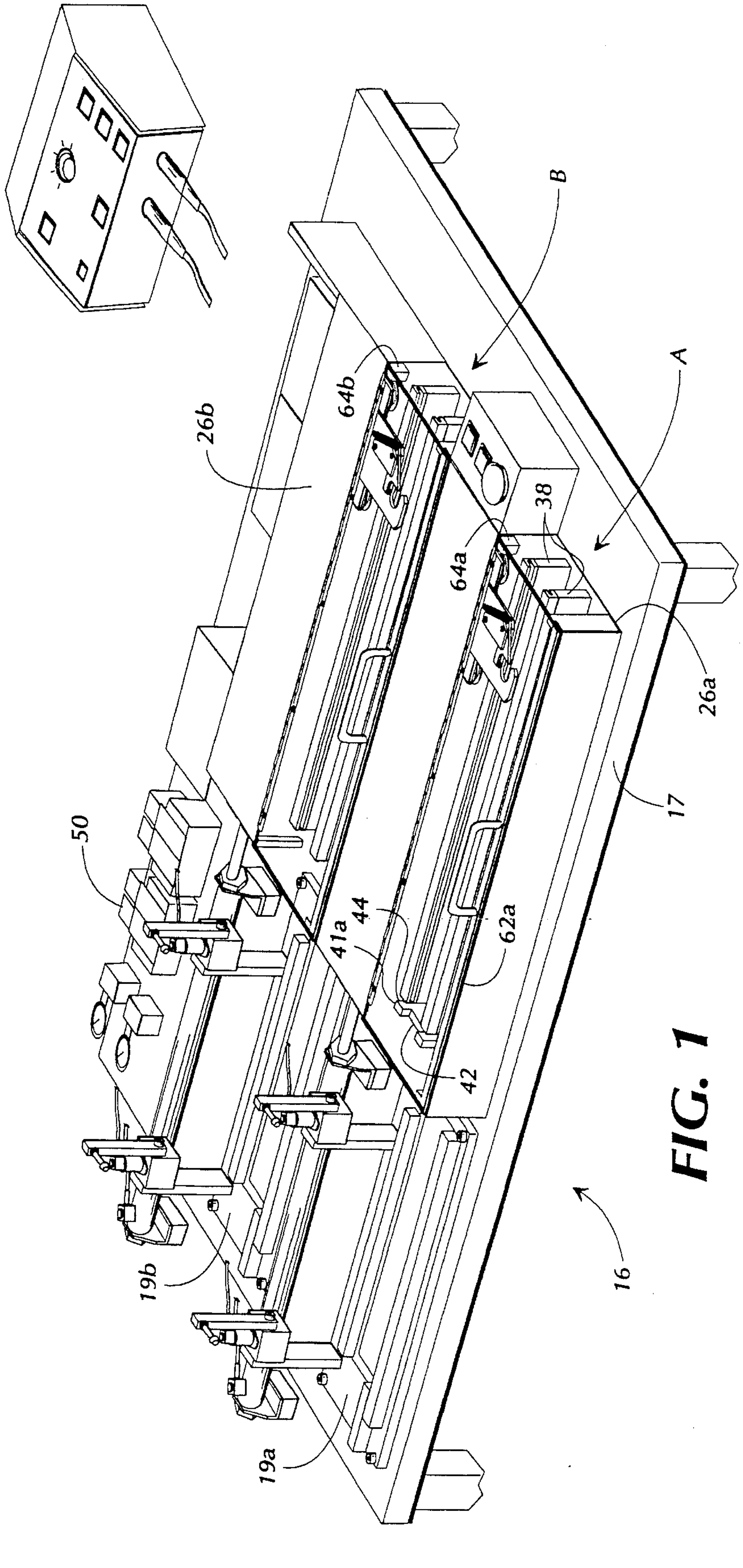
FIG. 1 is a pictorial view showing a toner cartridge resealing apparatus according to a preferred embodiment of the present invention.
Figure 2:
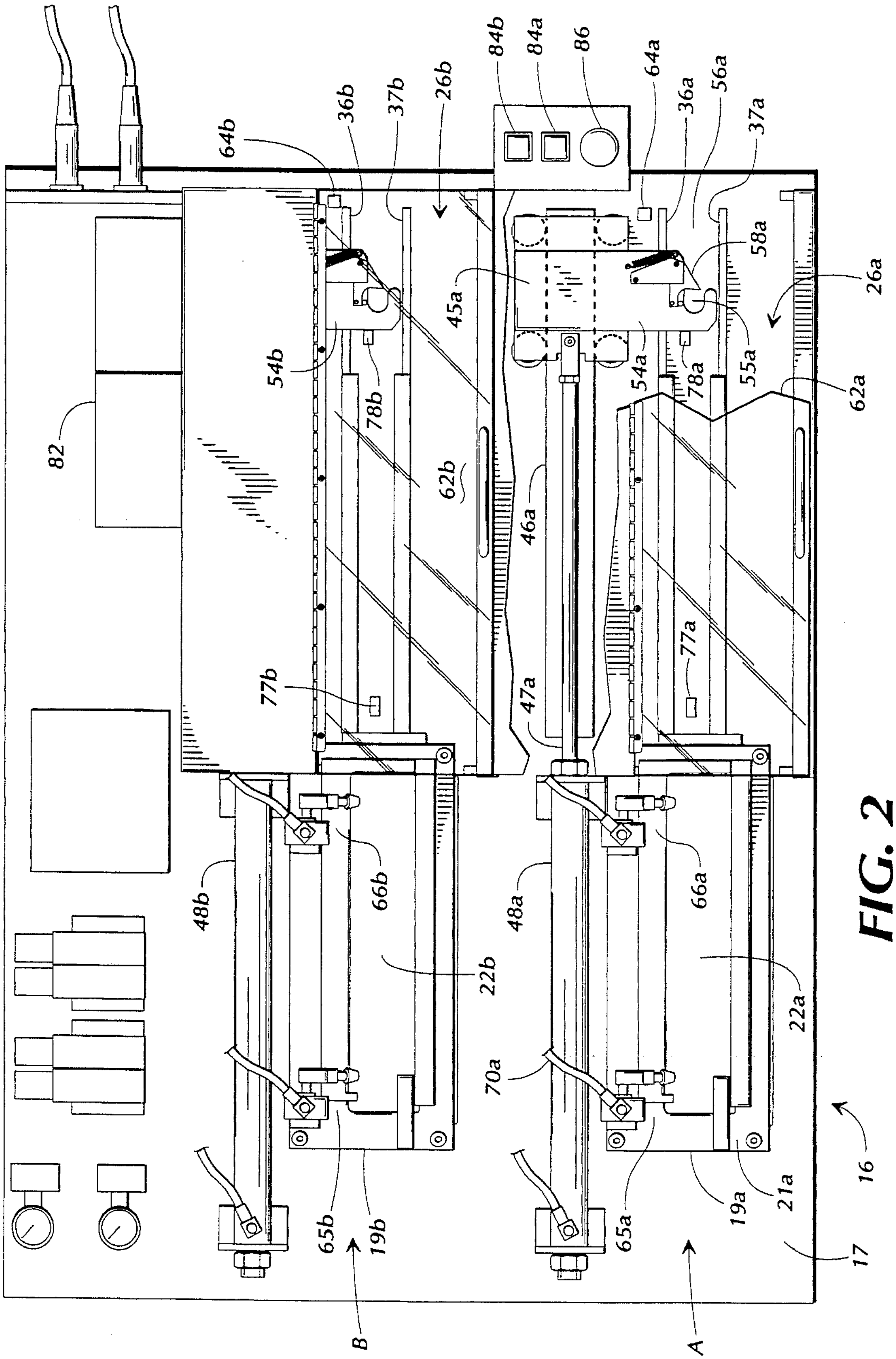
FIG. 2 is a plan view of the apparatus shown in FIG. 1.

Turning first to FIGS. 1 and 2, there is shown generally at 10 a resealing apparatus 16. This resealing apparatus has a base 17 supporting a pair of resealing work stations generally shown at A and B on FIG. 1. The elements making up each of these work stations are the same, and these common elements are designated herein with the corresponding suffixes "a" or "b" appended to the reference numerals associated with those common elements. The following description emphasizes the work station A and the elements associated with that work station, although it should be understood that the work station B contains similar elements identified by the corresponding suffix.

The work station A has a fixture **19*a* mounted near the left side of the base 17. That fixture 19*a* is configured to receive a particular kind of toner cartridge 20*a* (FIG. 3) and to maintain that toner cartridge in a certain predetermined position on the base. Because the exterior configuration of toner cartridges win differ from one print engine to another, the shape of a particular fixture 19*a* is determined by the external configuration of the toner cartridge currently being resealed by the present apparatus. For that reason, the fixture 19*a* preferably is attached to the base 17** by bolts or other fasteners that allow relatively easy substitution of different fixtures as needed to accommodate different kinds of toner cartridges being resealed with the present apparatus.

As best seen in FIG. 2, the fixture **19*a* includes a base 21*a* surrounding and defining a generally rectangular central cutout region 22*a* in the fixture. The base 21*a* provides vertical support for the toner cartridges 20*a* temporarily received by the fixture, and a lower portion of the toner cartridge can protrude downwardly through the cutout region 22. It win be understood that a particular fixture 19*a*** may include other abutment or locating surfaces that mate with complementary surfaces of a particular toner cartridge so that the cartridge, once placed in the fixture, cannot undergo longitudinal or lateral movement relative to the fixture.

Figure 5:
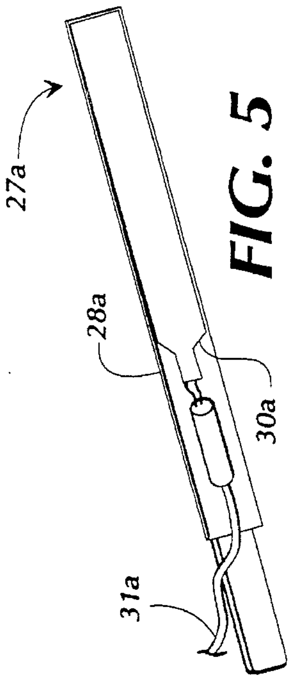
FIG. 5 is a pictorial view showing the reverse side of the seal insertion tool shown in FIG. 4.
Figure 4:
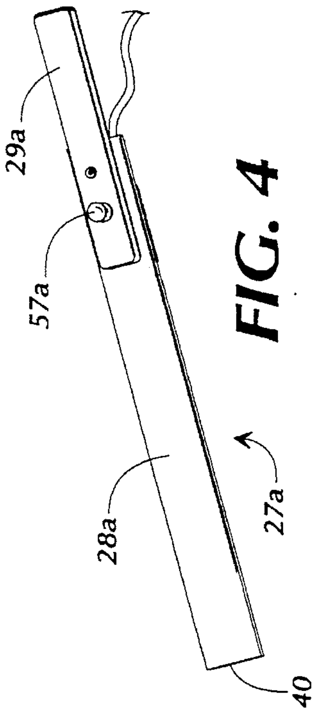
FIG. 4 is a pictorial view of the seal insertion tool shown in FIG. 3.
Figure 3:
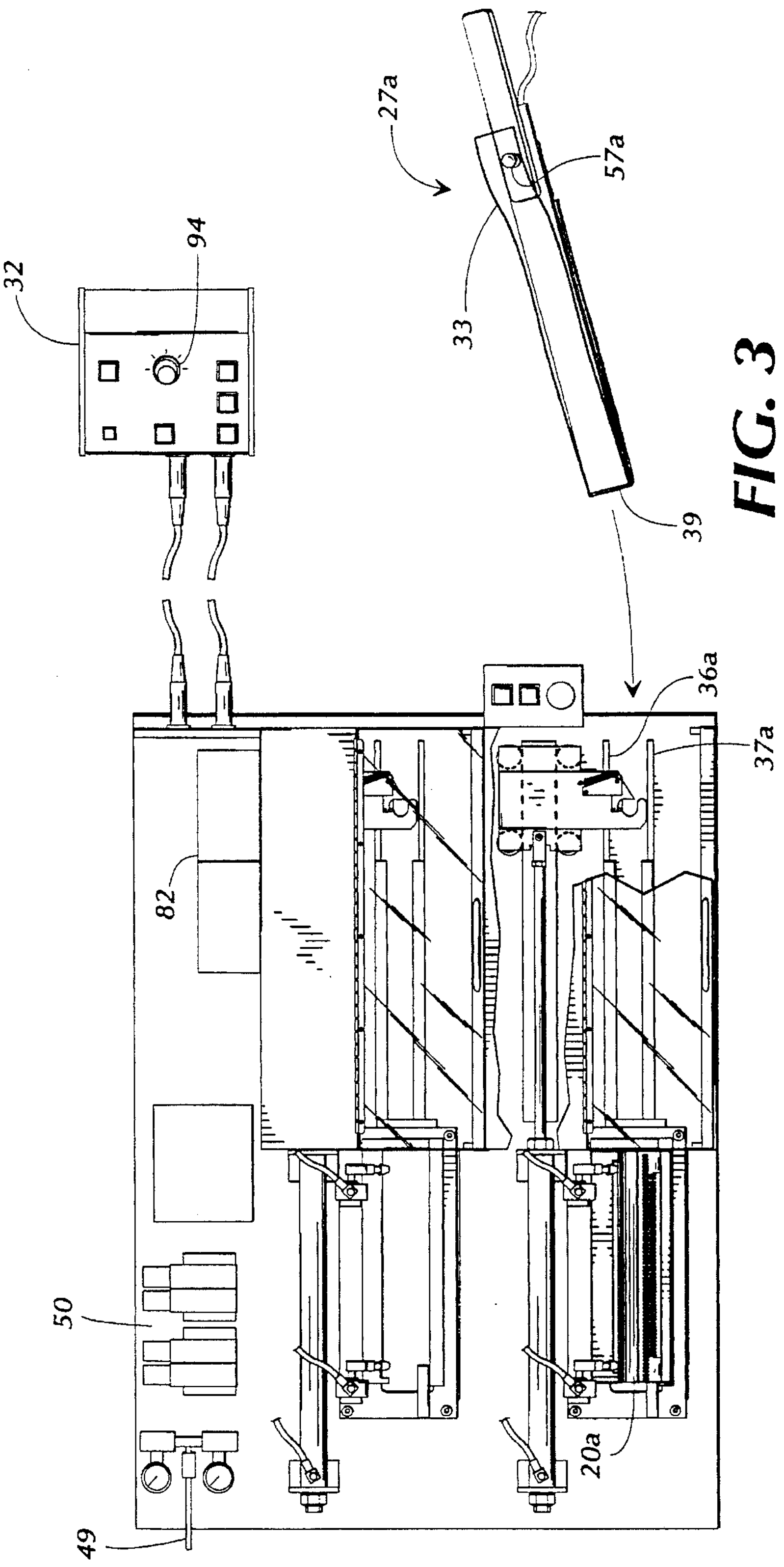
FIG. 3 is a view as in FIG. 2, reduced in scale and illustrating the placement of a seal insertion tool into the apparatus.

Situated to the right of the fixture **19*a*, its viewed in FIG. 1, is a guide 26*a* designed to receive a seal insertion tool and to support that tool for movement along a predetermined path leading to a toner cartridge 20*a* supported by the fixture 19*a*. One of the seal insertion tools 27*a* is shown in FIGS. 3–5, it being understood that a separate such tool (not shown) is provided in association with the work station B. The seal insertion tool 27*a* includes an elongated spatulate plate 28*a* of rectangular configuration, with a handle 29*a* attached to one end of the plate. The plate 28*a* in the preferred embodiment is made of stainless steel. On the lower side of that plate 28*a* is a heating element such as the resistance heating grid 30*a* shown in FIG. 4. The plate 28*a* must be sufficiently thin to slide within the slot 43 (FIG. 10) present in the toner cartridge being resealed. However, the plate 28*a* should have sufficient mass so that the plate itself does not absorb substantial heat during the short time the heating element 30*a* operates as described below. The resistance heating element 30*a* preferably is relatively thin, in the nature of a printed circuit, and is secured to the bottom surface of the plate 28*a* to provide good thermal transfer into a seal 33 carried by the plate. The heating element 30 is connected by a power cord 31*a* to a suitable source of electrical power such as the heater power supply 32**, described below in greater detail. The single heater power supply selectively supplies power to the resistance heaters associated with the seal insertion tools for both work stations, although only one seal insertion tool at a time can receive healing power as described below.

The seal insertion tool **27*a* supports a seal 33 which becomes transferred to the toner cartridge 20 a on the fixture 19*a*. The seals 33, described below in greater detail, are thin flexible plastic members having approximately the width of the plate 28*a*** and twice the length of that plate, and are folded in a U-shape to fit over both sides of the plate. The length of the seal should be more than twice the length of the opening to be sealed, plus enough to allow the end user to easily pull the seal from the assembled cartridge for operation in the printer.

Looking at FIG. 1, it win be seen that the guide **26*a* comprises a pair of laterally spaced-apart guide bars 36*a* and 37*a*. An elongated slot 38 is formed on the inside of each guide bar, the width of each slot being slightly greater than the thickness of the plate 28*a* associated with the seal insertion tool 27*a*. The two slots 38 face each other across the channel between the guide bars 36*a* and 37*a*, so that the seal insertion tool 27*a* can be slidably introduced into those slots as illustrated in FIG. 2**.

As illustrated in FIG. 3, the fold 39 of the seal 33 fits over the leading edge 40 (FIG. 4) of the seal insertion tool **27*a* as that leading edge is manually inserted into the slots 38 in the guide bars 36***a* and 37*a*. The slots 38 thus constrain the seal insertion tool 27*a* for movement in the channel between the guide bars, along a predetermined path leading toward the fixture 19*a* and a toner cartridge 20*a* in that fixture. This predetermined path is aligned with a slot 43 (FIG. 10) in the toner cartridge, which win receive the plate 28*a* of the sealing insertion tool 27*a* and the seal 33 carried on that plate.

A tool support block 41*a*, FIG. 1, is mounted close beyond the left end of the guide 26*a*, between that guide and the fixture 19*a*. The tool support block 41*a* defines a channel 42 the width of the insertion tool plate 28*a*, and this channel is flanked by the raised sides 44. The plate 28*a* slides through the channel of the tool support block 41*a* when the seal insertion tool is extended within the guide 26*c*, as described below.

Each work station A and B has a motorized actuator for extending the respective seal insertion tool 27*a* for juxtaposition with the fixture 19*a* and a toner cartridge supported by that fixture, or retracting the seal insertion tool from the toner cartridge. Each motorized actuator in the preferred embodiment includes a carriage 45*a* mounted for reciprocating movement along the longitudinal track 46 mounted to one side of the guide 26*a* and parallel to that guide. The carriage 45*a* is traversed along the track 46 by the piston rod 47*a* associated with the double-acting air cylinder 48*a*, which is mounted a short distance behind the fixture 19*a*. The air cylinder 48*a* is a double-action cylinder that positively extends or retracts the piston rod 47*a* as fluid pressure is applied to the respective ends of the cylinder. The air cylinders 48*a* and 48*b* selectively receive air pressure from the air line 49 and respective solenoid-operated control valves indicated generally at 50.

Figure 7:
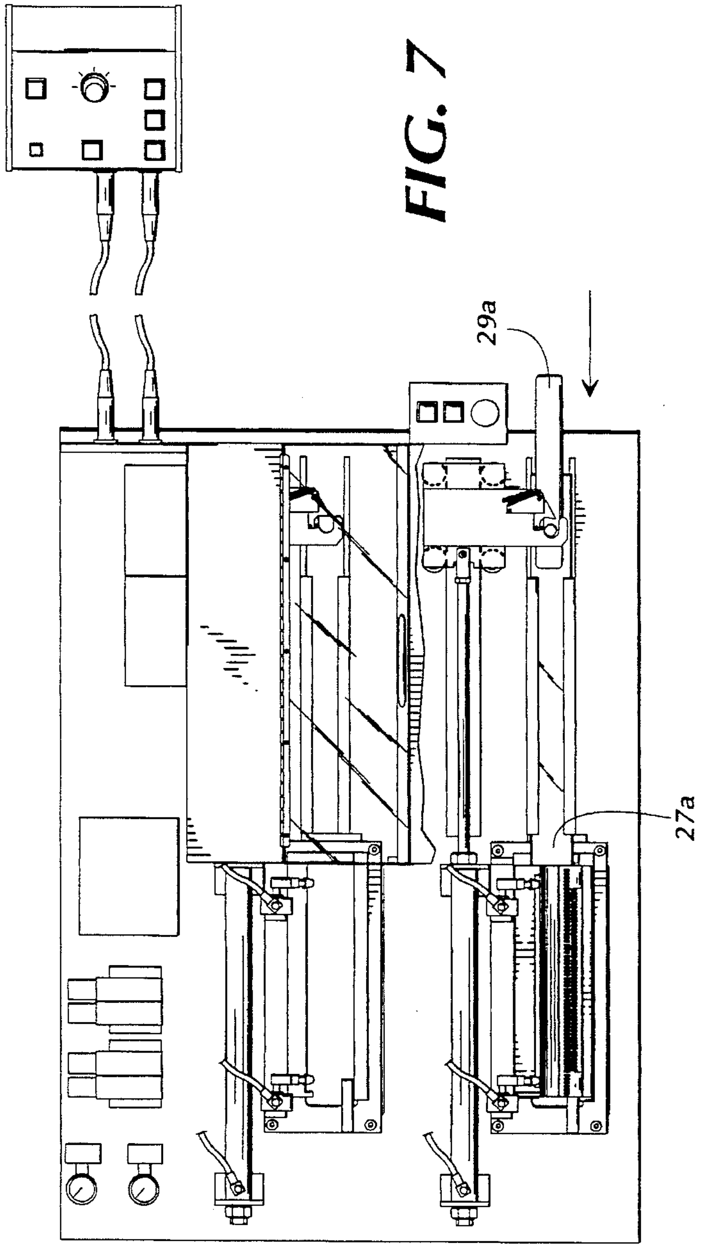
FIG. 7 is a plan view as in FIG. 2, showing a seal insertion tool fully loaded into a guide in the apparatus.
Figure 8:
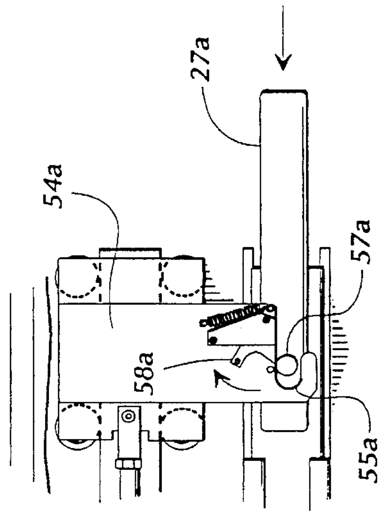
FIG. 8 is a detail plan view showing the latching mechanism for holding the seal insertion tool.

A tool engaging member 54*a* extends laterally from the carriage 45*a* to overlie at least part of the guide 26*a*. The tool engaging member 54*a* in the preferred embodiment has the shape of a fiat plate having a generally U-shaped opening 55*a* overlying the channel between the guide bars 36*a* and 37*a* and facing toward the entry throat 56 of that channel. This opening 55 accepts the knob 57*a*, best seen in FIGS. 4 and 8, projecting outwardly from one fiat side of the seal insertion tool 27*a*. With the tool engaging member 54*a* fully retracted from the fixture 19 as shown in FIGS. 7 and 8, the knob 57*a* enters the opening 55*a* in the tool engaging member when the seal insertion tool 27*a* is manually inserted in the slots 38 of the guide 26*a*. When the seal insertion tool is thus inserted so that the knob 57*a* enters the opening 55*a* of the tool engaging member, that knob displaces and then is retained by a spring-loaded catch plate 58*a* mounted on the tool engaging member. The seal insertion tool 27*a*, and the seal 33 previously placed on that tool, now is ready for extension into juxtaposed relation with the fixture 19*a* and a toner cartridge 20*a* supported thereon, when the air cylinder 48*a* is actuated.

A guard cover 62*a* is located above the guide 26*a* of the first work station A. The back longitudinal edge of the guard cover 62*a* is connected to the work station by a hinge 63*a*, allowing the guard cover to pivot upwardly for access to the guide 26*a* and to insert or remove a seal insertion tool 27*a* within that guide. The guard cover 62*a* is elevated above the tool engaging member 54*a* so as not to interfere with the movement of that member in response to operation of the air cylinder 48*a*. A switch 64*a*, which may be an electromechanical limit switch, is mounted to detect whether the guard cover 62*a* is raised or lowered and to produce a corresponding signal condition, so that the tool engaging member 54*a* can travel along the guide 26*a* only when the guard cover is closed.

Figure 6:
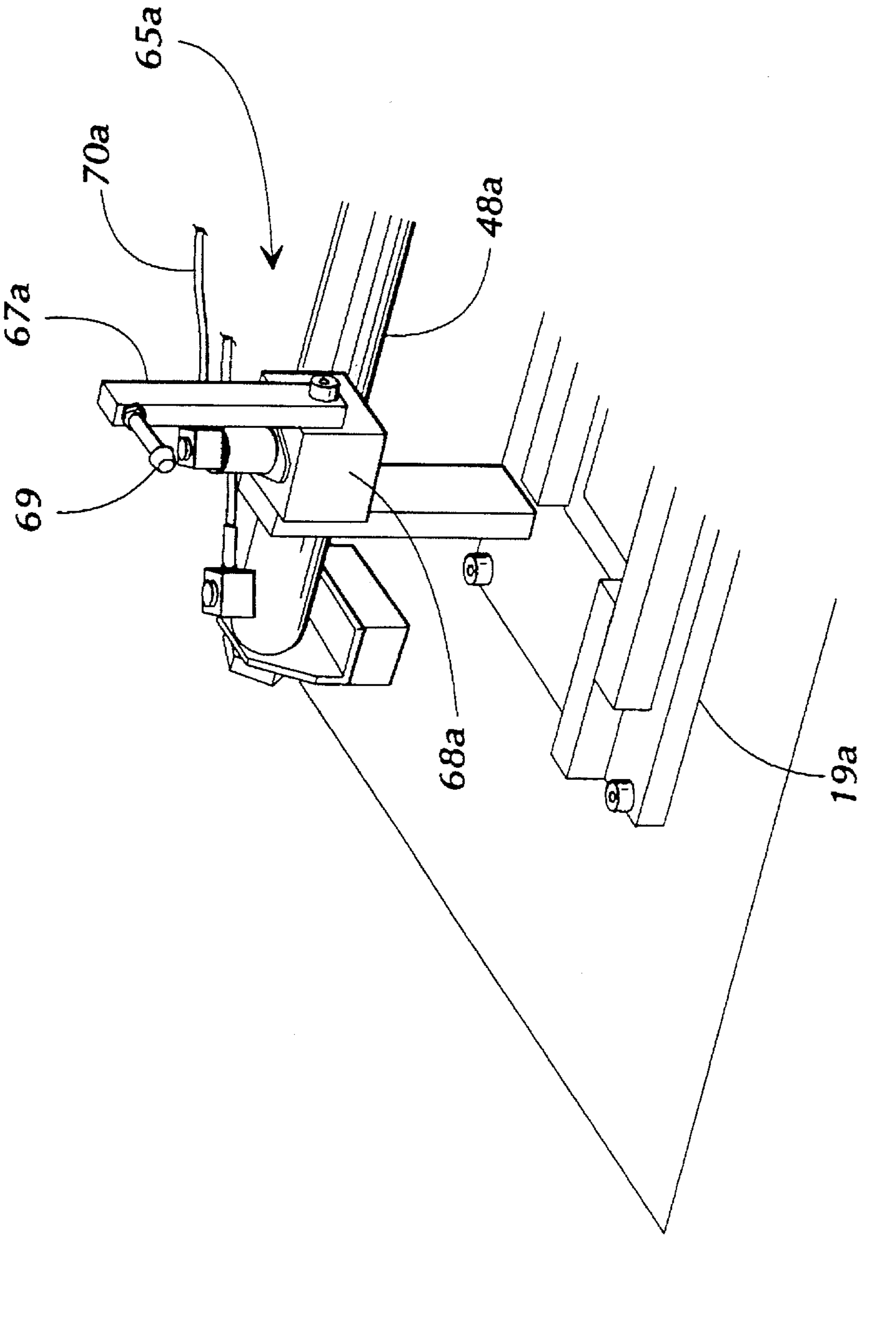
FIG. 6 is a fragmentary pictorial view of a clamp used in the preferred embodiment.
Figure 10:
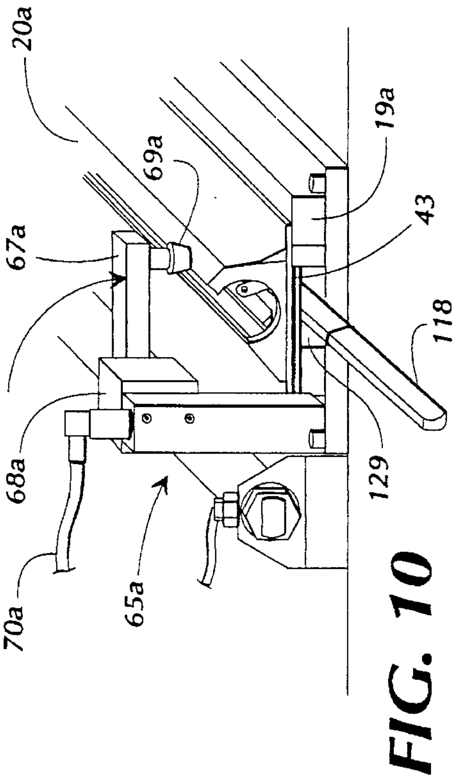
FIG. 10 is a fragmentary end elevation view taken from the left of FIG. 9, showing a clamp member engaging the toner cartridge and a cartridge support tool according to the present invention protruding from that cartridge.

A pair of clamps 65*a* and 66*a* are located immediately in back of the fixture 19*a*, to selectively engage a toner cartridge 20*a* supported by the fixture. These clamps are actuated to press downwardly on the toner cartridge once the tool engaging member 54 is positioned within the slot 43 of that cartridge. Each clamp 65*a* and 65*b*, as best seen in FIGS. 1 and 6, includes an arm 67*a* having one end mounted to the shaft of an air-powered rotary actuator 68*a*. A contact element 69*a* is mounted at the remote end of the clamp arm 67*a*, appropriately configured to engage a confronting surface of a toner cartridge 20*a*. As best seen in FIG. 10, the outermost tip of the contact element 69*a* includes a button-shaped member preferably made of rubber or another suitable elastomer, which softens the impact upon contacting the toner cartridge 20*a* and which can accommodate minor variations in elevation of the toner cartridge at the point of contact. The rotary actuator 65*a* is an air-powered motor connected to receive pressurized air through the air line 70*a* from the solenoid-operated control valves 50, FIG. 1. In the preferred embodiment disclosed herein, the arm 67*a* of each clamp 65*a* normally is in a substantially vertical position, displacing the contact element 69*a* away from the toner cartridge 20*a* carried by the fixture 19*a*, when no air pressure is applied to the rotary actuator 68*a*. When air pressure is applied, the output shaft and the arm 67*a* attached to that shaft rotates approximately 90° to place the arm in a substantially horizontal position, which brings the contact element 69*a* into position pressing downwardly against a point on the upper surface of the toner cartridge.

The two clamps 65*a* and 66*a* associated with the work station A press downwardly against the toner cartridge at two points. Instead of downward pressure applied at those two discrete points by the contact element 69*a* of each clamp, those contact elements optionally can be replaced by an elongated contact bar (not shown) that extends between the arms 67*a* of the two clamps 65*a*, 66*a* to press downwardly against a substantial lengthwise portion of the toner cartridge and thus distribute the downward force along that portion of the toner cartridge.

Figure 9:
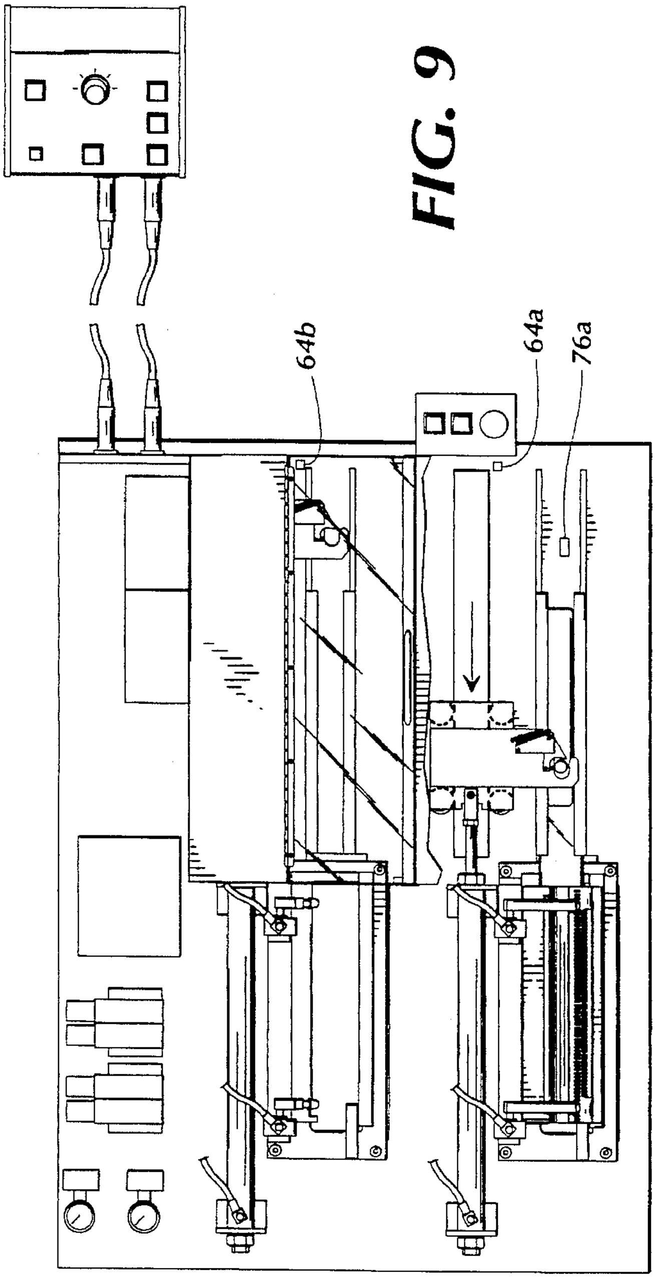
FIG. 9 is a plan view as in FIG. 7, with the motorized actuator operated to extend the seal insertion tool into juxtaposition with a toner cartridge.

The position of the tool engaging member 54*a* along the guide 26*a* is detected by a pair of sensors 76*a* (FIG. 9) and 77*a* (FIG. 2). These two sensors in the present embodiment are magnetic sensors actuated in response to the presence of a magnet 78*a* (FIG. 2) carried by the tool engaging member 54*a*. Both sensors 76*a* and 77*a* are located on the bottom of the channel defined by the guide bars 36*a* and 37*a*. The sensor 76*a* is positioned near the right end of that channel, to be actuated by the magnet 78*a* when the tool engaging member 54*a* is in its fully-retracted position as shown in FIG. 2. The other sensor 77*a* is located near the left end of the channel, in position to sense the magnet 78*a* when the tool engaging member 54*a* is at the full-left position of travel, extending the seal insertion tool 27*a* into juxtaposition with the toner cartridge 20*a* located in the fixture 19*a*. The sensors 76*a* and 77*a* preferably are adjustably mounted relative to the length of the channel between the guide bars 36*a* and 37*a*, to permit fine-tuning the sensor positions corresponding with the fully-extended and fully-retracted positions of the tool engaging member 54*a*.

The operation of the present resealing apparatus 16 is now described. This operation is partially automated, under the control of a programmable logic controller (PLC) 82 mounted on the base 17. The PLC receives input signals from the switches 64*a*, 64*b* associated with the guard covers 62*a*, 62*b*, and with the sensors 76*a*, 77*a* and 76*b*, 77*b* associated with the tool engaging members of each work station A and B. Output signals from the PLC control the operation of the solenoid-operated control valves supplying air to the air cylinders 48*a*, 48*b*, to the rotary actuators 68*a*, 68*b* associated with the clamps 65*a*, 66*a*, and 65*b*, 66*b*, and with various control relays as described below to control the mechanical and electrical operation of the present apparatus. The sequence of operating steps for the present apparatus is described below. The construction and programming of PLCs to perform the particular sequence of operating steps is well within the abilities of one skilled in the art and is not repeated herein.

A resealing operation according to the present invention commences when the operator places a toner cartridge 20*a* to be resealed, in the fixture 19*a*. (It win be realized that the work station B can, if desired, be selected for resealing the first of several toner cartridges) Once the toner cartridge 20*a* is properly positioned in the fixture, the operator next selects the seal insertion tool 27*a*, which at this time is removed from the guide 26*a*, and places a new seal 33 over the plate 28*a* of that tool. The seals preferably are made of a polyester/EVA film and, as mentioned previously, are folded somewhat in a U-configuration so that the fold end 39 fits over the leading edge 40*a* of the plate 28*a*. The outer surface on the lower side of the U-shaped seal 33 is coated with a thermal adhesive having a melt point greater than room temperature but below a temperature that would risk damage to the plastic components of the toner cartridge 20*a*.

With the seal 33 thus placed on the seal insertion tool 27*a*, the operator inserts that seal insertion tool into the guide 26*a* by threading the side edges of the plate 28 into the slots 38*a* of the guide bars 36*a* and 37*a*. Once the plate 28*a* is inserted into those slots, the operator next manually slides the seal insertion tool 27*a* to the left until the knob 57*a* on that tool enters the opening 55*a* in the tool engaging member 54*a*. The spring-loaded catch plate 58*a* snaps behind the knob 57*a*, latching the seal insertion tool to the tool engaging member 54*a*.

With the seal insertion tool 27*a* thus disposed in the guide 26*a* of the first work station, the operator may now commence the automated portion of the resealing operation. To accomplish this, the operator must first close the guard cover 62, closing the switch 64 associated with that cover. The operator next momentarily presses the start switch 84*a* located on the control panel 85 mounted at the right of the base 17 as shown in FIG. 2. That control panel also contains the start switch 84*b* for the second work station B, and an emergency stop switch 86 which, when pressed, immediately disables the resealing apparatus 16 by disconnecting all electrical power and air pressure from the various operating components of that apparatus.

Figure 11:
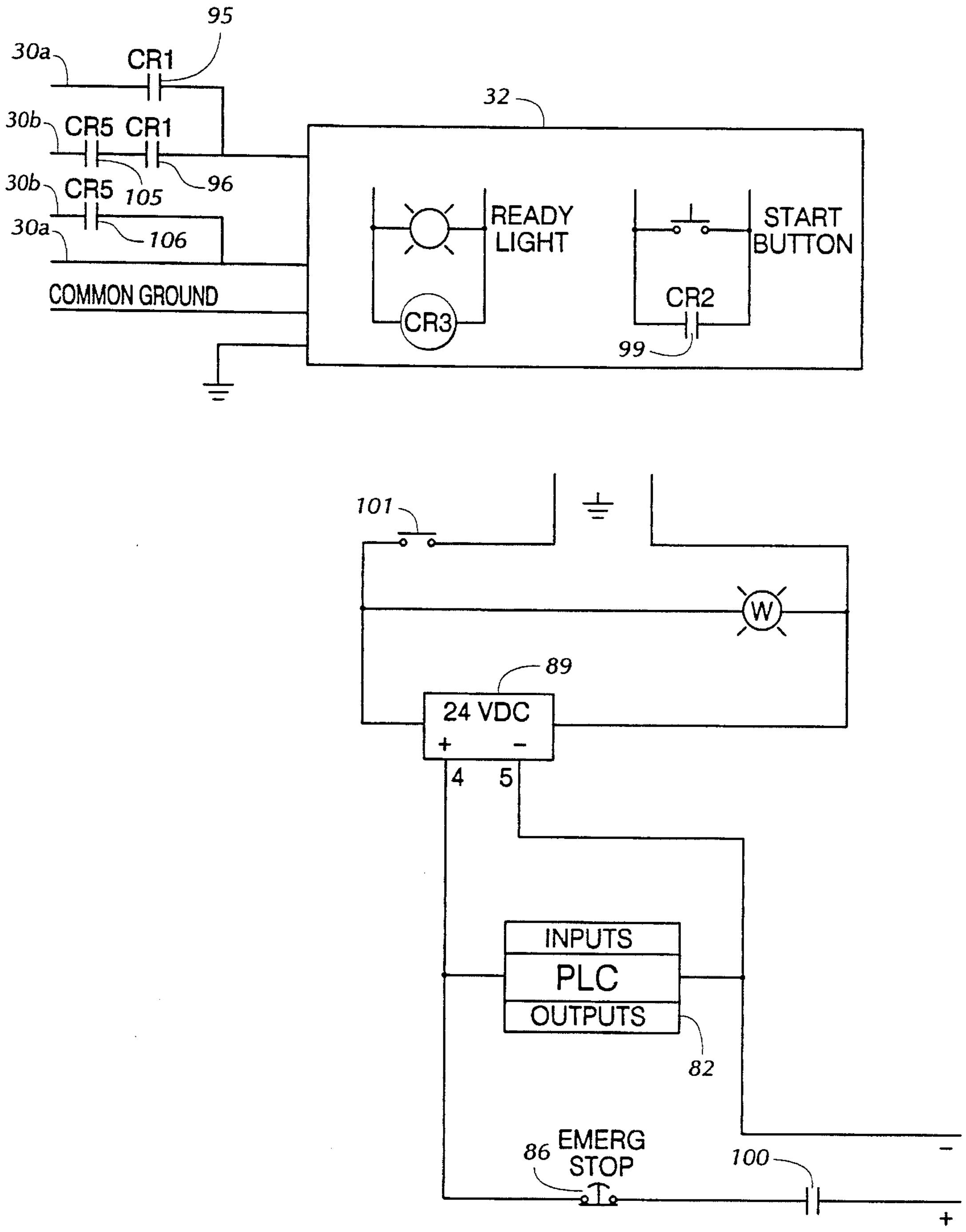
FIG. 11 is a schematic diagram showing electrical power control components used in the preferred embodiment.

Electrical heating power control components for the resealing apparatus are shown in FIG. 11, and input and output circuits associated with the PLC 82 are schematically shown in FIG. 2. The PLC 82 obtains operating power from the power supply 89, which also supplies low-voltage electrical power to the output terminals, collectively indicated at 90 in FIG. 3, of the PLC 82. The inputs to the PLC 82 are schematically indicated at 91 in FIG. 12.

Figure 12:
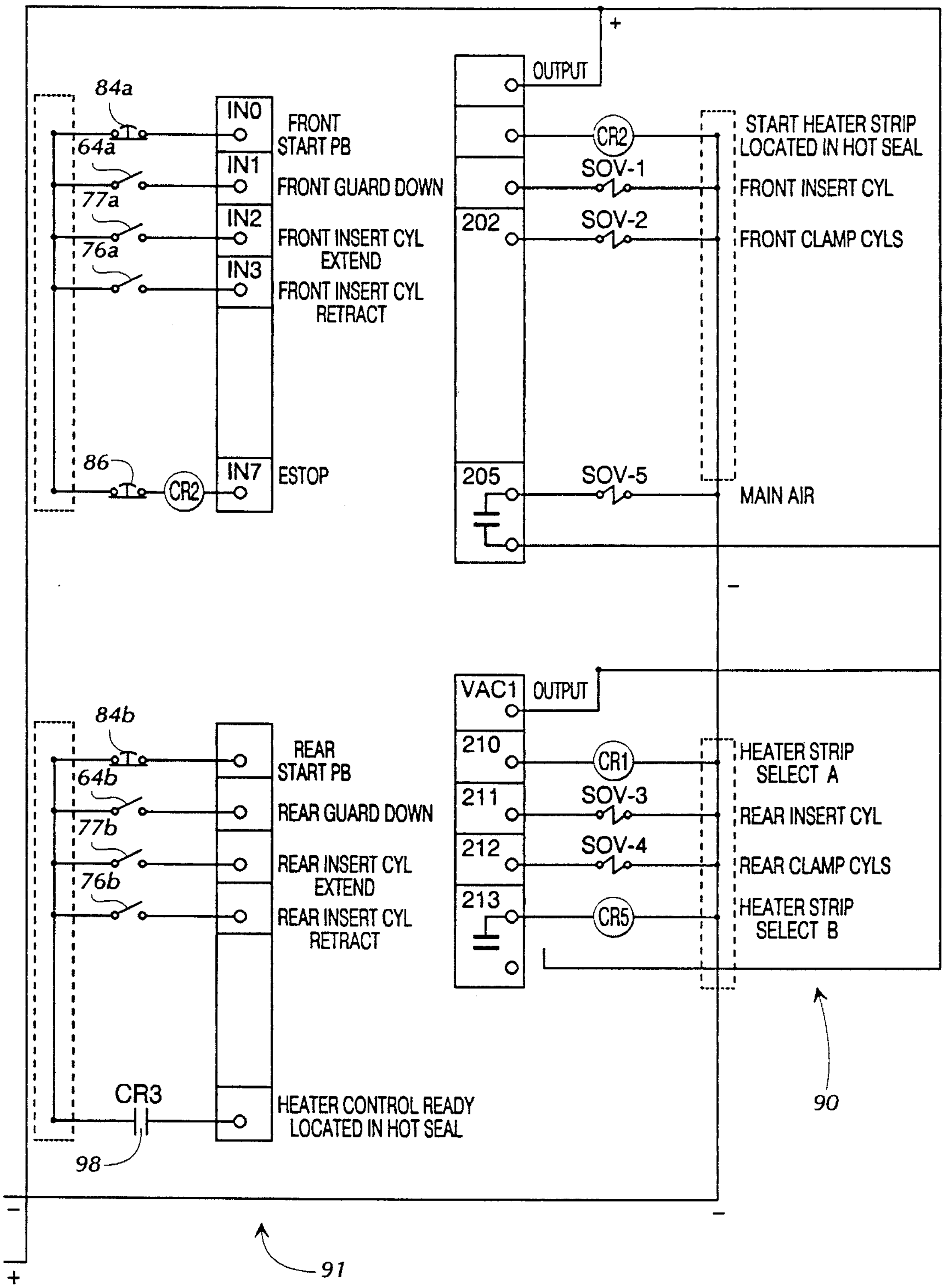
FIG. 12 is a schematic diagram showing the input and output circuits associated with the programmed logic controller in the preferred embodiment.

When the operator presses the start button 84*a* for the first work station, and the switch 64*a* senses that the guard cover 82*a* is down, the PLC 82 actuates the solenoid valve SOV-1 (FIG. 12). That solenoid valve applies air pressure to the right side of the air cylinder 48*a*, which thereby retracts the piston rod 47 to move the carriage 45*a* leftwardly from the fully-retracted position shown in FIG. 1 toward the fully-extended position shown in FIG. 9. This leftware movement of the carriage 45*a* carries with it the tool engaging member 54 and the seal insertion tool 27, which the operator previously loaded into the guide 26*a*.

When the sensor 77*a* signals that the seal insertion tool 27 is fully extended into the toner cartridge, the solenoid valve SOV-2 (FIG. 12) is actuated to supply air pressure to the rotary actuator 68*a* associated with each clamp 65*a* and 66*a*. The arms 67*a* of those rotary actuators immediately pivot downwardly as shown in FIG. 8, so that the contact elements 69*a* engage and apply downward force to an upper surface of the toner cartridge 20*a*. This downward force is transmitted through the toner cartridge to urge the seal 33, carried by the seal insertion tool 27*a*, into intimate contact with that portion of the toner cartridge immediately surrounding the opening to be resealed.

At this point, the plate 28*a* of the seal insertion tool 27*a* and the seal 33 previously disposed on that plate are positioned within the slot 43 of the toner cartridge 20*a*. The adhesive-coated surface of the seal thus is now positioned over the unsealed opening of the toner cartridge, and over the cartridge portion surrounding and defining that opening.

The sensed fully-extended position of the tool engaging member 54 also triggers the application of heating electrical power to the resistance heater 30*a* carried by the seal insertion tool 27*a*. This is accomplished by energizing the control relay CR1 to select the resistance heater 30*a* of the first work station A, and the control relay CR2 to start the heating cycle under control of the heater power supply 32. That power supply supplies output current at a voltage and amperage determined by the resistance heater 30*a*, for an adjustable duration set by the control 94 on the heater power supply. A typical heating time for the present apparatus is approximately 14 seconds, followed by a cool down time of approximately 14 seconds. The construction and operation of such heater power supplies are known to those skilled in the art.

Turning to FIG. 11, it win be seen that operation of the control relay CR2 closes the normally-open contact 99 in the heater power supply 32, commencing the heating cycle as aforementioned. At the same time, closure of the control relay CR1 closes the normally-open contact 95 (FIG. 11 ) in the line extending to one side of the resistance heater 30*a*, and opens the normally-closed contact 96 leading to one side of the resistance heater 30*b* associated with the other seal insertion tool 27*b*. This operation of the heater select relay CR1 thus insures that heating power from the heater power supply 32 is supplied only to the seal insertion tool 27*a*, and not to the other seal insertion tool 27*b*. This disablement of heating power to the other seal insertion tool is important, because the operator may be handling that tool while the first work station A is operating.

As the heater 30*a* of the seal insertion tool 27*a* is heated, the adhesive on the seal 33 carried by that tool is melted, allowing the lower fold of the seal to become bonded to the plastic surrounding the toner opening in the cartridge 20*a*. The cool down portion of the heating cycle allows the seal 33 to cool sufficiently so that the adhesive bonds the seal to the toner cartridge. The heater power supply 32 signals the end of the heating-cool down cycle by actuating the control relay CR3, providing an input to the PLC 82 by means of the contact 98 (FIG. 12) operated by that control relay. In response to that input, the PLC disables the solenoid valve SOV-2 to release the rotary actuators 68*a* of the clamps 65 and 66, and also reverses position of the solenoid valve SOV-1 so that the air cylinder 48*a* extends the piston rod 47*a*. This extension returns the carriage 45*a* and the tool engaging member 54*a* to the rightward position shown in FIG. 2, withdrawing the seal insertion tool 27*a* from its previous juxtaposition with the toner cartridge 20*a*. However, the seal 33, which now is adhesively bonded to reseal the toner dispensing opening in that cartridge, remains in place in the cartridge as the seal insertion tool is withdrawn. When the tool engaging member 54 returns to its rightmost starting position as shown in FIG. 7, the sensor 76*a* detects that return and thus signals the end of a resealing cycle for the first work station A. The operator now may remove the resealed toner cartridge 20*a* from the fixture 19*a* and place in that fixture another toner cartridge to be resealed. The operator also may withdraw the seal insertion tool 27*a* from the channel 26*a* by manually releasing the spring-loaded catch plate 58*a* of the tool engaging member 54*a*.

If the operator were to raise the guard cover 62*a* during the foregoing sequence of operation, the switch 64*a* senses that occurrence and the PLC 82 interrupts control power to all control relays and solenoid valves currently actuated, thereby interrupting the resealing process. This is a safety precaution, so that the operator cannot be injured by movement of the tool engaging member 54, for example, while the guard cover is raised. Similarly, if the operator presses the emergency stop switch 86, that switch interrupts power to the control relay CR2 and thereby opens the contact 99 in the heater power supply 32 and the contact 100 in the low-voltage line leading to the output terminals 90 of the PLC. The system must then be reset by removing and restoring power to the PLC, by operating the main power switch 101 shown in FIG. 11.

Once the operator presses the start switch 84*a* to initiate the resealing sequence as described above, the aforementioned steps of that sequence take place without further operator intervention until the tool actuating member 54*a* withdraws the seal insertion tool from the now-resealed toner cartridge 20*a*. While these resealing steps are taking place in the first work station A, the operator may prepare the second work station B for resealing another toner cartridge. That preparation is the same as described above for the work station A. Once a toner cartridge is placed in the fixture 19*b* and the seal insertion tool 27*b* with a seal 33 is inserted into the guide 26*b*, the operator can press the start switch 84*b* associated with the second work station B. In response to operation of the start switch 84*b*, the air cylinder 48*b* moves the tool engaging member 54*b* leftwardly, placing the seal insertion tool 27*b* into juxtaposition with the toner cartridge located in the fixture 19*b*. Once the seal insertion tool 27*b* is fully disposed within the toner cartridge 27*b*, the clamps 65*b* are operated to press downwardly against the top of that toner cartridge. At this point in the resealing cycle of the second work station B, power must be supplied to the resistance heater 30*b* associated with the seal insertion tool 27*b*. However, no such power can be applied if the heater power supply 32 is still in its heating cycle for the first work station A. Once that previous heating cycle is finished, the control relay CR3 associated with the heater power supply 32 signals that event by reopening the contact 98, signaling to the PLC 82 that the heater power supply is ready to commence another operating cycle. In response to that signal, the control relay CR2 is again actuated to start a new operating cycle of the heater power supply 32. At the same time, the control relay CR5 is actuated to select the resistance heater associated with the second seal insertion tool 27*b*. With the control relay CR5 actuated and the control relay CR1 presently unactuated, power is supplied through the normally-closed contact 96 of CR1 and the now-closed contacts 105, 106 in the circuit leading to the resistance heater 30*b*. Heating current from the heater power supply 32 thus is supplied to the heater 30*b* of the seal insertion tool 27*b*, while the open contact 95 prevents heating current from flowing to the heater 30*a* of the other seal insertion tool. The remainder of the resealing sequence progresses for the second work station B, giving the operator an opportunity to service the first work station A by removing the now-sealed toner cartridge and preparing that work station for yet another resealing operation.

FIGS. 13, 14, 15, and 15*a* show a backup tool 116 used for resealing toner cartridges according to the preferred embodiment of the present invention. As previously mentioned, the downward force applied to a toner cartridge by the clamps 65 and 66 may sometimes cause deformation of the relatively thin housing making up the toner cartridge. If this deformation warps the surface of the toner cartridge immediately surrounding the opening to be resealed, the seal 33 may not make a good and uniform contact with that surface. The present backup tool 116 is intended to overcome or prevent the occurrence of this problem.

The backup tool 116 comprises an elongate central rod 117 which may have at one end 118 a handle defined by an elastomeric coating or any other device to assist in grasping the tool. An upper bar 119 and a lower bar 120 are maintained on opposite sides of the central rod 117, at the end thereof remote frown the handle 118, by the two parallel links 121 and 122. These links are pivoted at their midpoints to the central rod 117 by means of the pins 123 and 124, fixed to the central rod 117 and pivotably received in openings through the links. The upper ends of the links 121,122 are pivotably attached to the upper bar 119, and the lower ends of those links likewise are pivotably attached to the lower bar 120. The length of the lower bar 120 may be substantially the distance between the two parallel links 121,122, so that the lower bar, the parallel links, and the span of the upper bar 119 between the two links, form a four-bar linkage. The upper and lower bars 119 and 121 thus undergo equal-and-opposite movement when pivoting from the fully-retracted position shown in FIG. 11 to the fully-extended position shown in FIG. 13. Several notches 125 are formed in the sides of the upper and lower bars 119, 120 and in one side of the central rod 117 to accommodate the heads of the various pivot pins when the linkage is folded as shown in FIG. 15.

Figures 13, 14, 15, 15A:
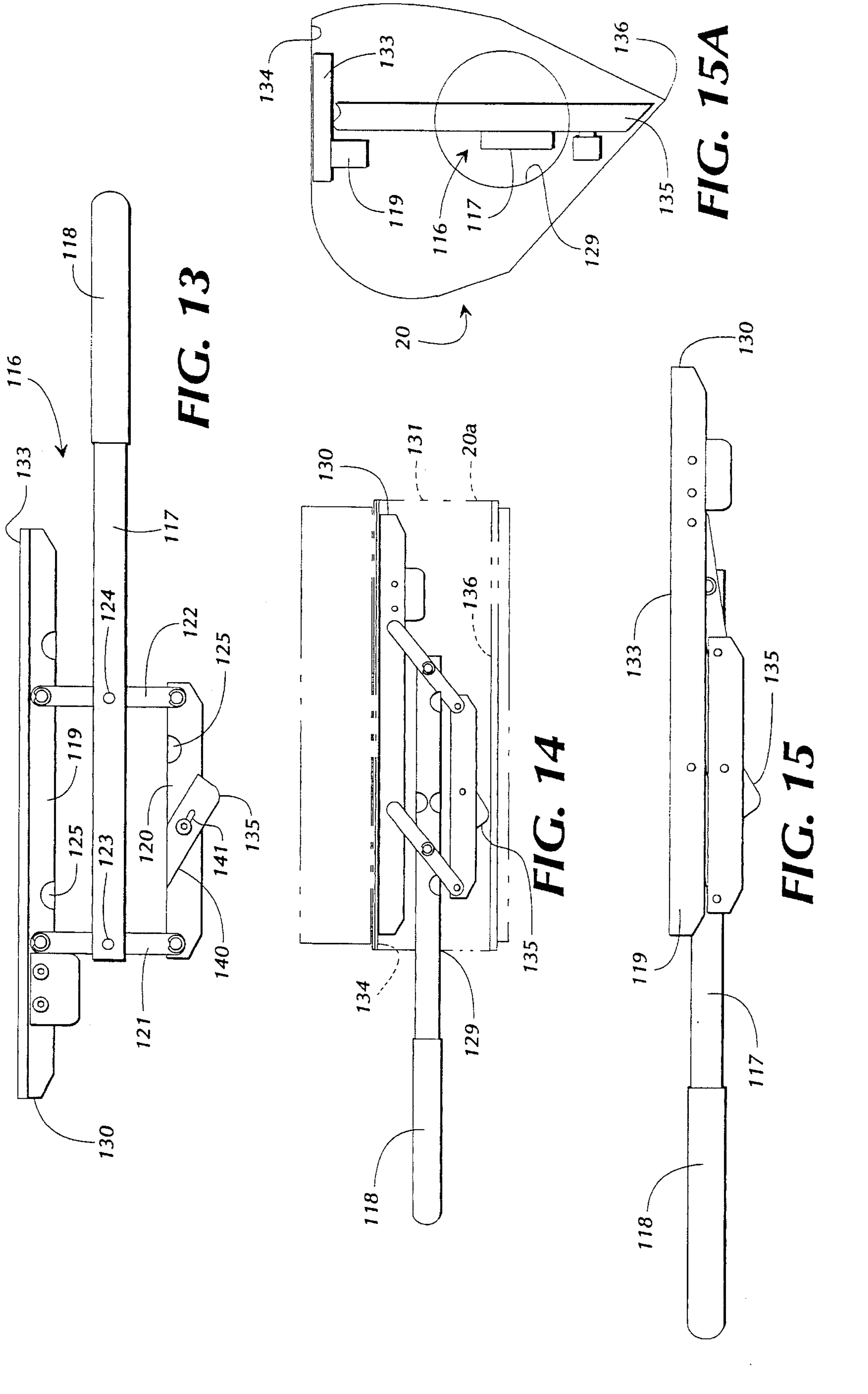
FIG. 13 is a front elevation view showing a cartridge support tool according to a preferred embodiment of the present invention.
FIG. 14 is a rear elevation view of the tool shown in FIG. 13.
FIG. 15 is a rear elevation view as in FIG. 14, showing the tool in folded position.
FIG. 15A is a plan view showing a backup tool inserted into the existing opening of an empty toner cartridge.

Considering the operation of the backup tool 116, that tool is first placed in its folded configuration as in FIG. 15 and is then inserted into the existing opening 129, best seen in FIGS. 10 and 15A, of an empty toner cartridge 20*a* placed in one of the fixtures 19*a*. The operator moves the tool 116 inwardly into the toner cartridge until the remote end 130 of the upper bar 119 contacts the back wall 131 of the toner cartridge. As the operator continues to move the handle 118 inwardly through the opening 129, the linkage comprising the links 121, 122 and the lower bar 120 is forced open to the position shown in FIG. 13. In that open position, a plate 133 at the top of the upper bar 119 is moved into position against the underside of the upper surface 134 within the toner cartridge 20*a*. At the same time, the stop 135, attached to the lower bar 120 and protruding a distance downwardly from that bar, becomes lodged in the V-shaped bottom 136 formed by the bottom of the toner cartridge 20*a*. This arrangement is best seen in FIG. 15A. It will thus be understood that the four-bar linkage of the tool 116 is now expanded to provide a rigid vertical support extending between the upper surface 134 of the toner cartridge and the V-shaped bottom of that cartridge.

After the toner cartridge is resealed, the tool 116 ia removed by pulling the handle 118 away from the cartridge. That pulling effort collapses the tool to the configuration shown in FIG. 11, so that the tool can be removed through the opening 129

The stop 135 preferably is a piece separate from the lower bar 120 and is contained within a channel 140 formed in a side of that lower bar. A fastener extends through a slot 141 in the stop 135 to secure the stop at a desired location within the channel 140, thereby allowing some adjustment of the effective distance between the plate 133 on the upper bar 119 and the stop 135 when the tool 116 is fully extended within a toner cartridge as shown in FIG. 13. The stop 135 preferably has a rounded lower surface and is made of a relatively soft material such as Teflon® or the like, to avoid puncturing or deforming the bottoms of toner cartridges.

Although the resealing apparatus described herein is a two-station machine, the present invention is not limited by the number of work stations. It win also be understood that a single-station machine can utilize the concepts disclosed herein.

It should be understood that the foregoing relates only to a preferred embodiment of the present invention and that numerous additions and changes thereto may be made without departing from the spirit and scope of the invention as defined in the following claims.

What is claimed is:

1. Apparatus for resealing a toner cartridge, comprising:

a fixture for supporting a toner cartridge to maintain an unsealed opening of the cartridge in a certain attitude;

a guide located in predetermined alignment with the fixture and operative to receive a seal insertion tool carrying a seal, the guide supporting the tool for movement along a predetermined path leading to the unsealed opening of a cartridge supported by the fixture;

a motorized actuator operative to engage a seal insertion tool received in the guide and selectively moveable to transfer the tool along the predetermined path so that the tool and the seal carried by the tool become juxtaposed with the cartridge with the seal aligned to cover the unsealed opening;

a clamp located adjacent the fixture and selectively operative to engage the cartridge so as to urge the tool toward the unsealed opening, whereby the seal carried by the tool becomes in intimate contact with the cartridge surrounding the unsealed opening; and means to heat the tool sufficiently to adhere the seal to the cartridge surrounding the opening and thereby seal the opening, so that the adhered seal remains in place on the cartridge as the motive means thereafter withdraws the tool from the overlaying position.

2. Apparatus as in claim 1, wherein:

the guide has a channel to engage the tool and constrain the tool for movement along the predetermined path; and further comprising a member which engages the tool engaged in the channel; and the motorized actuator comprises a motor selectably operative to move the tool-engaging member so as to extend the tool in the channel toward the fixture for said juxtaposition with a cartridge in the fixture or to retract the tool from the fixture.

3. Apparatus as in claim 2, wherein:

the motor comprises a fluid-powered cylinder having a piston connected to the member and operative to move the tool-engaging member along the channel so as to extend or retract the tool in the channel.

4. Apparatus as in claim 2, wherein:

the means to heat the tool comprises a heating element associated with the tool and a control element selectively operative to supply power to the heating element; and further comprising a sensor responsive to the position of the tool in said juxtaposition and operative to cause the control element to supply power to the heating element, so that the seal becomes heated and thereby adheres to the cartridge.

5. Apparatus as in claim 1, wherein:

the clamp comprises at least one motor and a presser member connected to the motor to selectively press against the cartridge.

6. Apparatus as in claim 2, wherein:

the clamp comprises at least one motor and a presser member operative to press against the cartridge in response to selective operation of the clamp motor;

the means to heat the tool comprises a heating element associated with the tool and a control element selectively operative to supply power to the heating element; and further comprising a sensor responsive to the retracted position of the tool-engaging member to provide a signal corresponding to the retracted position;

a sensor responsive to the extended position of the tool-engaging member to produce a signal corresponding to the extended position; and a programmable controller responsive to the signals from the sensors and to a start signal to actuate the motor associated with the tool-engaging member to move the tool-engaging member so as to extend the tool to the juxtaposed position, to actuate the motor of the clamp apparatus in response to the signal corresponding to the extended position, to operate the control element to supply power to the heating element after the clamp motor is actuated, and to actuate the motor of the tool-engaging member to return the tool-engaging member to the retracted position after the seal is adhered to the cartridge.

7. Apparatus for resealing a toner cartridge, comprising:

a pair of work stations positioned adjacent one another, each work station comprising a fixture for supporting a toner cartridge to maintain an unsealed opening of the cartridge in a certain attitude;

a guide located in predetermined alignment with the fixture of the corresponding work station and operative to receive a seal insertion tool carrying a seal, the guide supporting the tool for movement along a predetermined path leading to the unsealed opening of a cartridge supported by the fixture;

a motorized actuator having a member which engages a seal insertion tool in the guide and selectively operative to extend the tool along the predetermined path so that the tool and the seal carried by the tool become juxtaposed with the cartridge with the seal aligned to cover the unsealed opening, or to retract the tool from the fixture;

a clamp selectively moveable to press against the cartridge at a point spaced apart from the juxtaposed tool so as to urge the tool toward the unsealed opening, whereby the seal carried by the tool becomes in intimate contact with the cartridge surrounding the unsealed opening;

a sensor responsive to the retracted position of the actuator to provide a signal corresponding to the retracted position;

a sensor responsive to the extended position of the actuator to produce a signal corresponding to the extended position; and means to heat the tool sufficiently to adhere the seal to the cartridge surrounding the opening and thereby seal the opening, so that the adhered seal remains in place on the cartridge as the motive means thereafter withdraws the tool from the overlaying position; and the apparatus further comprising a programmable controller responsive to the signals from the sensors and to a start signal to actuate the motorized actuator to move the tool-engaging member so as to extend the tool to the juxtaposed position, to actuate the motor of the clamp in response to the signal corresponding to the extended position, to operate the control element to supply power to the heating element after the clamp motor is actuated, to release the clamp after the seal is adhered to the cartridge, and to actuate the motorized actuator to return the tool-engaging member to the retracted position after the seal is adhered to the cartridge.

8. Method for resealing a toner cartridge, comprising the steps of:

providing a fixture for supporting a toner cartridge to maintain an unsealed opening of the cartridge in a certain attitude;

providing a guide located in predetermined alignment with the fixture and operative to receive a seal insertion tool carrying a seal, such that the guide supports the tool for movement along a predetermined path leading to the unsealed opening of a cartridge maintained by the fixture in said certain attitude;

placing in the guide a seal insertion tool with a seal disposed thereon;

extending the seal insert-ion tool in the guide to transfer the tool along the predetermined path until the tool and the seal carried by the tool become juxtaposed with the cartridge with the seal aligned to cover the unsealed opening;

producing a signal when the seal insertion tool is so extended;

responsive to the signal, applying a clamping force to the cartridge to urge the seal insertion tool toward the unsealed opening so that the seal carried by the tool becomes in intimate contact with the cartridge surrounding the unsealed opening, and heating the seal insertion tool sufficiently to make the seal adherent to the cartridge:

allowing the seal insertion tool to cool so that the seal becomes affixed to the cartridge; and retracting the seal insertion tool from the fixture while the seal remains affixed to the cartridge to seal the opening.

* * * * *